Feb. 7, 1967 A. SABATINO ET AL 3,303,056

BATTERY TERMINAL CONSTRUCTION

Original Filed July 17, 1963 2 Sheets-Sheet 1

INVENTORS
ANTHONY SABATINO
DANIEL ORLANDO
BY
ATTORNEY

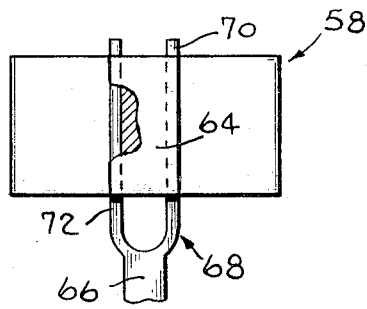
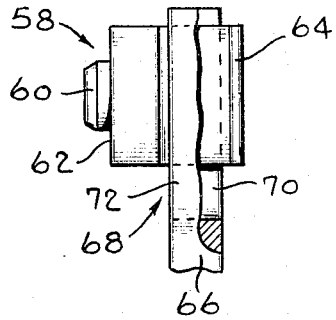
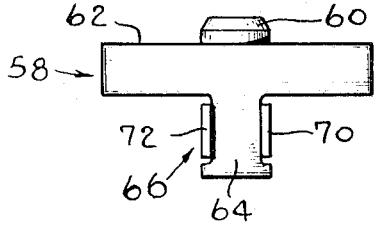
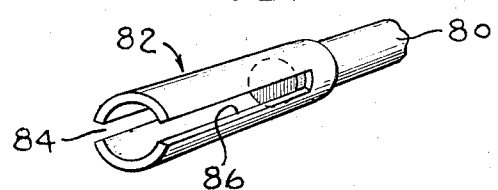
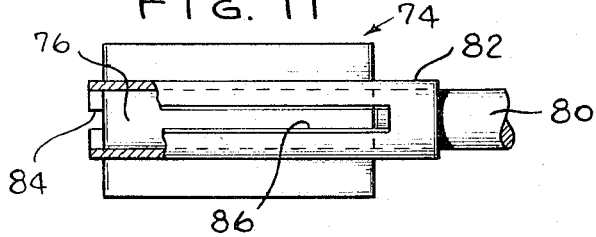
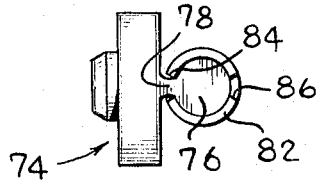
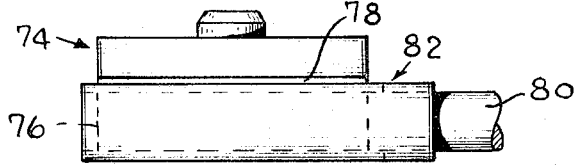
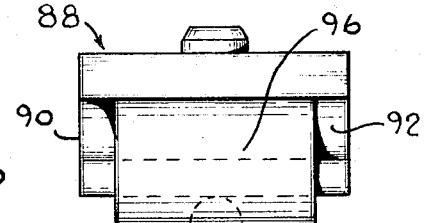
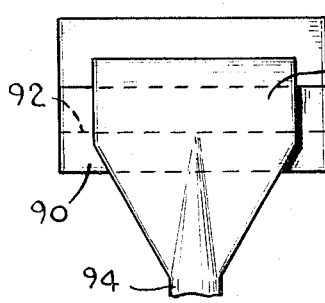
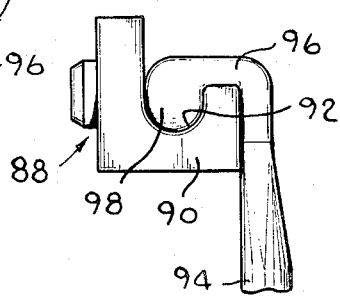

United States Patent Office 3,303,056
Patented Feb. 7, 1967

3,303,056
BATTERY TERMINAL CONSTRUCTION
Anthony Sabatino and Daniel Orlando, both of Milwaukee, Wis., assignors to Globe-Union Inc., Milwaukee, Wis., a corporation of Delaware
Continuation of application Ser. No. 295,777, July 17, 1963. This application June 14, 1966, Ser. No. 557,592
7 Claims. (Cl. 136—135)

This is a continuation of Sabatino et al. copending application No. 295,777, filed July 17, 1963, now abandoned.

This invention relates to the construction and arrangement of the external terminals of an electric storage battery and, more particularly, one which is particularly well suited for use in a battery having internally disposed intercell connections.

The conventional and most commonly accepted practice in electric storage battery construction, has been to extend the terminal posts through the battery cover. Generally, the terminal posts are integrally moulded with the end cell straps which requires specially molded straps for at least two of the battery cells or, if not integrally molded, the posts must eventually be connected to the straps thereby introducing an additional step in the manufacturing process with a corresponding increase in manufacturing costs. Furthermore, the length of post necessary to extend through the battery cover requires a substantial amount of material and, moreover, provides a relatively high resistance path from the end cells to the battery output cables. Another shortcoming of this type of terminal construction is that it limits the type of connection which can be made between the terminal posts and the battery output cables.

A primary object of this invention is to provide an improved connection between the external battery terminals and the internal battery cell elements.

More specific objects of this invention are to provide a relatively low resistance connection between the external terminals and the internal cells; to provide a construction which facilitates manufacture and which affords a saving in material; and to provide increased versatility in the type of connection which can be made between the battery terminals and the battery output cables.

For the achievement of these and other objects, this invention proposes to position the external terminal at the battery case wall and to join it to the internal cell assemblies by a connection through the battery wall, either the side or end wall. With such an arrangement, a uniform cell strap construction can be used throughout the battery and a relatively facile and economical method of forming the connection between the battery cell strap and the external terminals can be utilized, for example resistance welding such as is disclosed and claimed in our copending application, Serial No. 132,660, filed August 21, 1961, for "Storage Battery Construction and Method of Making Same" and assigned to the assignee of this application. Furthermore, with the external battery terminals positioned at the case wall of the battery, the types of connections which can be used between the terminals and the battery output cables are virtually unlimited.

The novel features of this invention are set forth in the appended claims. The invention itself, together with additional objects and advantages thereof, will be more clearly understood from a reading of the following description in connection with the accompanying drawings wherein preferred embodiments of the invention are illustrated and in which:

FIGS. 8–10 are front, top and end views, respectively, of an alternative external terminal construction;

FIGS. 11 and 12 are front and top views, respectively, of still another alternative external terminal construction and a cooperating output cable connector;

FIG. 13 is a perspective view of the output cable connector for the terminal construction illustrated in FIGS. 11 and 12;

FIG. 14 is an end view of the alternative construction of FIGS. 11 and 12; and

FIGS. 15–17 are front, side and top views, respectively, of a further alternative external terminal construction and cooperating output cable connector.

Figure 1:
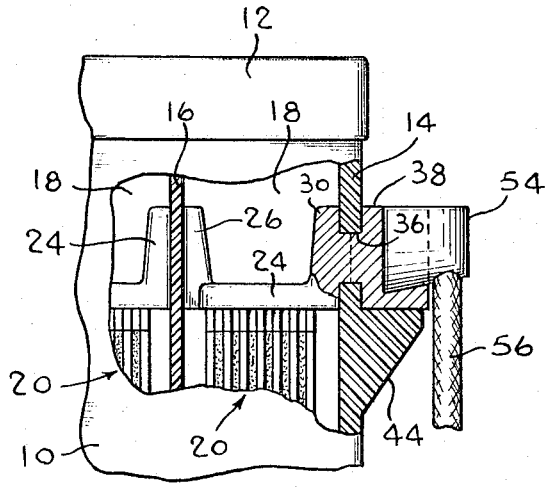
FIG. 1 illustrates a portion of a battery with the case wall broken away to show the connection, through the wall, between the battery strap and the external terminal.
Figure 7:
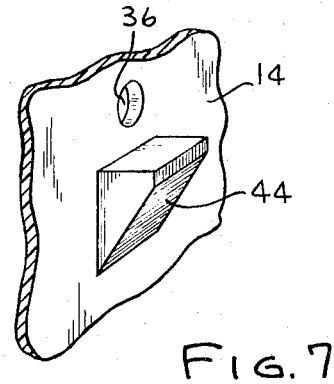
FIG. 7 is a perspective view of the portion of the battery wall showing the aperture through which the connection is made and the gusset provided to support the external terminal.

With particular reference to the drawings in FIG. 1 a portion of a battery case is illustrated and includes a side wall 10, a cover 12 and an end wall 14. Preferably, the battery case includes a number of internal partitions 16 dividing the interior of the case into separate compartments 18 for receipt of battery cell element assemblies 20. The cell element assemblies 20 can be constructed in any well-known manner whereby the negative plates of the cell assembly are interconnected by one of the conductive battery straps 24 or 26 and the positive plates are interconnected by the other battery strap. Adjacent cell element assemblies 20 are preferably connected by an intercell weld joint through a partition 16 and connecting a battery strap 26 of one cell assembly to a battery strap 24 of an adjacent cell assembly, this connection may be in accordance with the procedure set forth in our above identified co-pending application.

Figure 2:
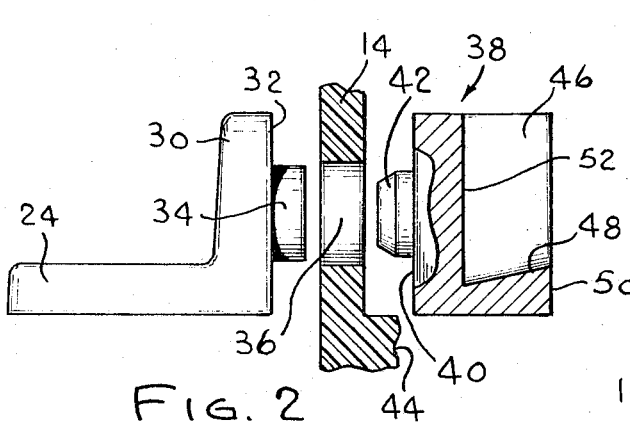
FIG. 2 is an enlarged view of the battery strap and external terminal before the connection therebetween is made.

In accordance with this invention, it is proposed that the connection to the external battery terminals be made through the end wall 14 of the battery; however, it will be appreciated that the connection could be made through the battery side walls as well. Furthermore, although illustrated in connection with a battery construction having the cell assemblies connected by internal connections, it will be appreciated that the external terminal construction of this invention could be used with other types of construction, e.g. one utilizing an external link connection between cells. More particularly and with reference to FIGS 1 and 2, conductive strap 24 includes a vertically extending leg 30 having a generally planar face 32 and a connector lug 34 extending from face 32. When the end cell element assembly is positioned in its compartment 18, face 32 is adapted to engage the inner face of the end wall and connector lug 34 is positioned in alignment with and for receipt in an end wall opening 36. Similarly, external terminal 38 includes a planar face 40 having a connector button 42 extending therefrom so that face 40 can be engaged with the outer surface of the battery case with button 42 positioned in opening 36. A gusset 44 is integrally molded with the end wall of the battery case to support external terminal 38 in alignment with opening 36 and, furthermore, to relieve the load on the final connection between battery strap 24 and external terminal 38; however, it will be appreciated that the gusset could be eliminated, if desired.

In the assembly process, connector lug 34 and connector button 42 are positioned in abutting relationship in opening 36 and pressure and heat are applied to battery strap 24 and external terminal 38 to effect a fusion between the lug and button and complete a weld joint between the battery strap and the external terminal. More particularly, the battery strap 24 and the external terminal 38 are urged toward each other under a pressure of approximately 800 pounds and an electric current of approximately 6,000 amps at 6 volts A.C. is passed through the connector lug and connector button to affect this weld, for example the welding apparatus similar to that disclosed and claimed in the co-pending application, Serial No. 268,359, filed March 27, 1963, for a "Process and Machine for Manufacturing Electric Storage Batteries" and assigned to the assignee of this application could be used to affect the weld. The heat generated by the resistance contact between the connector lug and connector button results in a homogeneous weld being formed between the external terminal and the internal conductor strap and, in the process of forming the weld the planar faces 32 and 40 are pressed into intimate, sealing engagement with the opposed faces of the end wall and the weld material completely fills opening 36 to complete a sealed joint at the end wall.

It will be noted that the distance between the cell strap 24 and the external connector is relatively small thereby affording both a marked reduction in the material necessary to connect the cell element assemblies externally of the battery and, furthermore, affords a relatively low resistance path. With the external terminal 38 positioned along the walls of the battery, as opposed to extending through the cover of the battery, the types of connection which can be made between the external terminal and the battery output cables is virtually unlimited and various examples of the types of connection which are possible will now be described.

Figure 5:
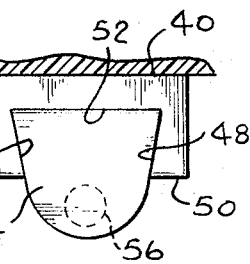
FIG. 5 is a top plan view of an output cable connector constructed for use with the external terminal of FIGS. 1–4.
Figure 6:
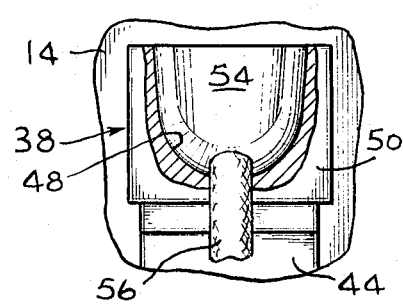
FIG. 6 is a front elevation of the cable connector.
Figure 3:
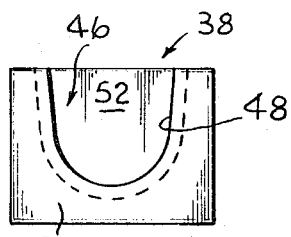
FIG. 3 is a front elevation of the external terminal.
Figure 4:
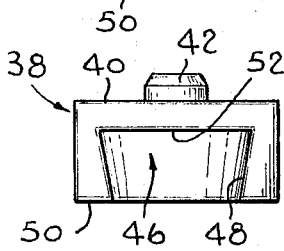
FIG. 4 is a top plan view of the terminal.

In connection with the embodiment of FIGS. 1–6, the external terminal 38 is illustrated as including an upwardly opening notch 46. Notch 46 is formed by a surface 48 which slopes downwardly and rearwardly from outer face 50 of the external connector toward inner face 52 of notch 46. Connector lug 54 of battery output cable 56 is generally wedge-shaped, as can be seen in FIGS. 1 and 5, so as to fit into the notch 46 and complete a dove-tail type connection between the cable and the external terminal. The relative ease of assembly and disassembly of this type of external connection is readily apparent from the drawings in that output cable connector lug 54 can be easily slipped into and out of the notch in the external terminal.

In the alternative embodiment illustrated in FIGS. 8–10, the external terminal 58 is provided with a weld connector button 60 and a planar face 62 for connection with the battery cell strap and engagement with the outer face of the battery wall as described above. In this instance, external terminal 58 includes a laterally extending, T-shaped projection 64 for receipt of an output cable clip 66. More particularly, clip 66 includes a bifurcated end 68, the fingers 70 and 72 of which slide over the T-shaped projection to establish a releasable connection therewith which permits quick and easy attachment and detachment of the battery cable with the external terminal.

In the alternative arrangement illustrated in FIGS. 11–14, the external terminal 74 is provided with an elongated cylindrical portion 76 connected to the terminal body by a web 78. For connection with this terminal, battery output cable 80 is provided with an elongated hollow spring clip 82 having diametrically opposed notches 84 and 86 extending generally along the length thereof. With this construction, the spring clip is slipped onto the cylindrical portion 76 with one of the notches 84 or 86 in registry with web 78 to hold the spring clip on the external terminal.

In FIGS. 15–17, the external connector 88 is illustrated as including a laterally extending shelf portion 90 having an upwardly opening notch 92 formed therein. The battery output cable 94 is provided with a generally L-shaped connector portion 96 having an end 98 adapted to fit into notch 92 and form a secure, releasable connection between the external terminal and the battery output cable.

The external terminal connection of this invention provides a marked saving in materials, reduces the resistance of the connection of the cell element assemblies with the external terminal, permits the use of simplified manufacturing techniques and also permits a wide selection in the types of connections to be used between the battery output cables and the external cables.

Although this invention has been illustrated and described in connection with particular embodiments thereof, it will be apparent to those skilled in the art that various changes and modifications may be made therein without departing from the spirit of the invention or from the scope of the appended claims.

What we claim is:

1. A battery terminal connection for connecting a battery element inside the battery case to an external battery cable through an aperture in a vertical side wall of the battery case comprising;

an internal metal strap member electrically connected to the plates of a battery element inside the battery case, a portion of said metal strap member positioned adjacent the aperture in the vertical side wall of the battery case;

an external metal terminal member positioned adjacent said aperture on the outside of said case, said external terminal member including an external connector means for releasably receiving an external battery cable;

a metal connector portion positioned inside said aperture and extending between said internal metal strap member and said external metal terminal member, the material of said connector portion being in pressure contact with said aperture with the pressure between said material and said aperture forming a fluid-tight seal at the aperture, said connector portion comprising a pair of metal projections, each formed integrally with said internal strap member and said external terminal member and each being fused to each other inside said aperture; and gusset means on and projecting externally from said case wall below said aperture and defining an upwardly facing shelf engaging and supporting said external metal terminal member.

2. A battery terminal connection according to claim 1 in which said internal metal strap member and said external metal terminal member each is provided with a substantially planar face thereon intimately engaging opposite faces of said case wall adjacent said aperture to form a seal joint at said aperture.

3. An external battery terminal connection according to claim 1 in which said external connector means includes an upwardly opening slot having a wedge-shape in horizontal cross section for receipt of and to form a dovetail-type connection with a mating battery cable connector.

4. A battery terminal connection according to claim 1 wherein a portion of said external metal terminal member is generally T-shaped in horizontal cross section with the cross portion of said T-shaped portion spaced outwardly from said case wall so that a clip-type cable connector can be engaged with and disengaged from said terminal member by moving said cable connector vertically, said cross portion preventing release of said clip-type connector by horizontal movement of said cable connector.

5. A battery terminal connection according to claim 1 in which said external connector means includes a generally cylindrical portion formed on said external metal terminal member and spaced outwardly therefrom, said cylindrical portion being adapted to receive a hollow cylindrical spring-clip-type connector.

6. A battery terminal connection according to claim 1 wherein said external connector means includes a portion formed on said external metal terminal member and extending outwardly from said case wall, said portion having an upwardly opening groove adapted for receipt of a mating battery connector cable.

7. A battery terminal connection for connecting a battery element inside the battery case to an external battery cable through an aperture in a vertical side wall of the battery case comprising:

an internal metal strap member electrically connected to the plates of a battery element inside the battery case, a portion of said metal strap member positioned adjacent the aperture in the vertical side wall of the battery case and having a sealing face thereon overlying the aperture on the inside of the vertical wall;

an external metal terminal member positioned adjacent said aperture on the outside of said case, said external terminal member having a sealing face thereon overlying the aperture on the outside of the vertical side wall;

an external connector means for releasably receiving an external battery cable, said external connector means including an upwardly opening slot having a wedge-shape in horizontal cross section for receipt of and to form a dovetail-type connection with a mating battery cable connector;

a metal connector portion positioned inside said battery and extending between said internal metal strap member and said external terminal member, the material of said metal connector portion being in sealing engagement with the wall of said aperture and said sealing faces on said internal and external member being in sealing engagement with opposite side of said vertical side wall, said connector portion comprising a pair of metal projections each formed integrally with said internal strap member and said external terminal member and each being fused to each other inside said aperture; and gusset means on and projecting externally from said case wall below said aperture and defining an upwardly facing shelf engaging and supporting said external metal terminal member.

No references cited.

WINSTON A. DOUGLAS, *Primary Examiner.*

D. L. WALTON, *Assistant Examiner.*